May 11, 1937. T. ZUSCHLAG 2,079,645
ELECTRICAL ANALYSIS METHOD
Filed March 23, 1934 2 Sheets-Sheet 1
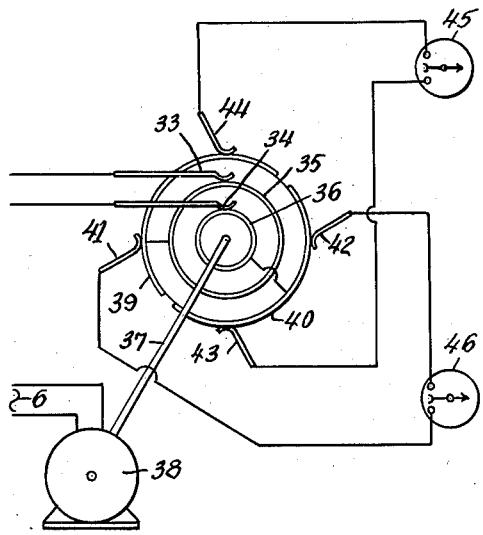
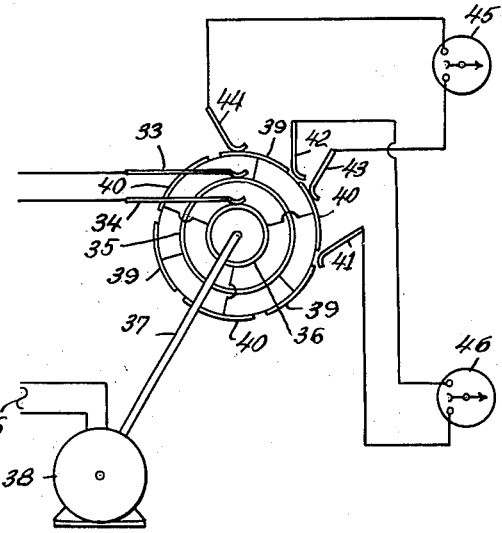
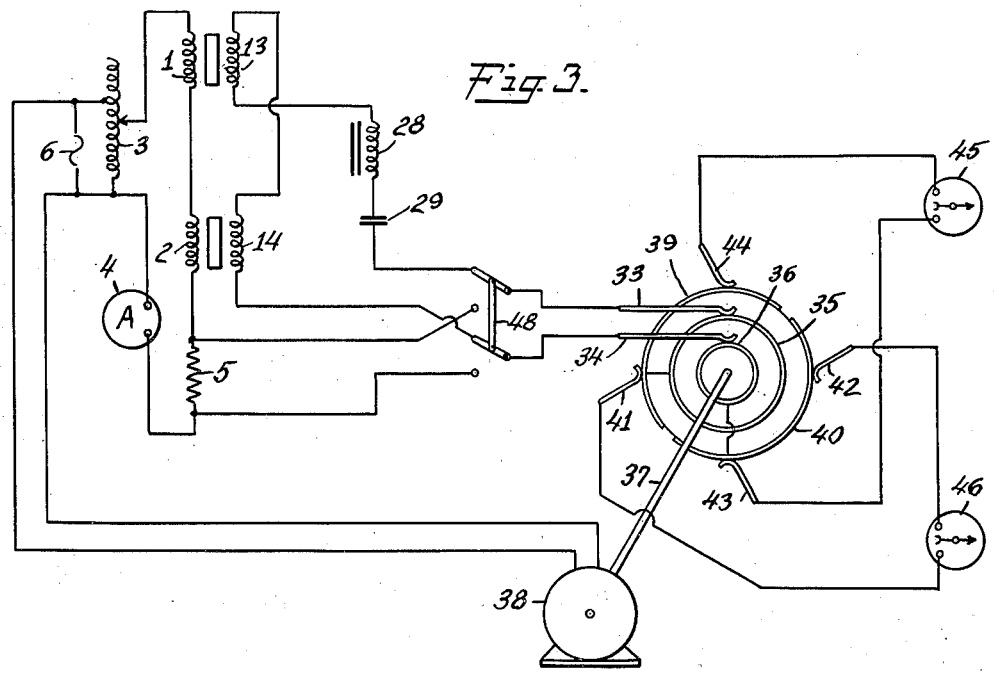
INVENTOR
Theodor Zuschlag
BY
Pennie, Davis, Marvin & Edmonds
ATTORNEYS May 11, 1937.                T. ZUSCHLAG                2,079,645
                    ELECTRICAL ANALYSIS METHOD
                    Filed March 23, 1934      2 Sheets-Sheet 2

INVENTOR
Theodor Zuschlag
BY
ATTORNEYS

Patented May 11, 1937

2,079,645

UNITED STATES PATENT OFFICE 2,079,645

ELECTRICAL ANALYSIS-METHOD

Theodor Zuschlag, Englewood, N. J., assignor to Magnetic Analysis Corporation, Long Island City, N. Y., a corporation of New York Application March 23, 1934, Serial No. 716,940

7 Claims. (Cl. 175—183)

This invention relates to electrical analysis and has for its object improvements in methods for electrical measurement. More specifically, the invention contemplates the analysis of an alternating current into two or more components, displaced from each other by a substantially constant phase angle, and the presentation of the integrated values of these components for inspection.

In electrical analysis and its kindred industrial applications it is frequently desirable to determine the characteristics of an alternating current. Among other factors which are frequently sought to be discovered are wave form, frequency, amplitude, phase relationships, etc. In the heretofore customary art of electrical analysis some of these factors have been determinable by reproducing for inspection the wave form of the alternating current by means of oscillographic types of instruments. Analysis of alternating currents, by these means, while sometimes satisfactory, has been subject to the objection that the apparatus involved was costly, delicate and required considerable operating skill. Hence for many electrical measurements the use of oscillographic types of instruments has been precluded by the character of the work.

As a result of my investigations I have discovered that it is possible to acquire the more useful information regarding an alternating current by breaking up the successive cycles with respect to two or more arbitrary origins displaced from each other by constant phase angles, delivering said components to current indicating means and integrating the components therein. The simultaneous indication of the phased displaced components permits the reconstruction of the current curve.

In accordance with my invention successive cycles of an alternating current to be analyzed are broken up in an arbitrarily established first phase to produce a component of the current in the first phase and simultaneously broken up in a second phase displaced from the first by a substantially constant angle (preferably of about 90 degrees) to produce a component of the current in the second phase. The two components thus produced are integrated separately and produced for inspection. Thereafter the position of the first phase and the second phase with respect to successive cycles of the current are shifted simultaneously to a new position while the constant angle between the two phases is preserved. In the new position successive cycles of the current are broken up into components respectively in the two shifted phases, and these components are separately integrated and produced for inspection. Preferably the shifting of the two phases with respect to successive cycles of the current is continued until one of the integrated components resulting in the new phase positions attains a maximum value and the other a minimum value.

The procedure set forth in the immediately preceding paragraph is equally adapted to the analysis of a voltage wave or an amperage wave of an alternating current. The phrase "successive cycles of alternating current" is employed to designate voltage waves of the current, amperage waves of the current or both.

Rarely does an alternating current obtained in commercial practice consist of a simple harmonic wave. More frequently, the current is complex and contains several harmonics of the base frequency. In the analysis of such a current it is desirable in some instances to suppress all but one harmonic, and analyze this in accordance with the principles of my invention. Accordingly, in one of the aspects of my invention a complex alternating current is filtered prior to analysis. The filter means may be of many of the well-known forms. In practice I have found that a suitable inductance and a suitable capacitance in series with each other are satisfactory as a filter means.

My invention will be better understood by reference to the following description in conjunction with the accompanying drawings, in which Fig. 1 represents a form of a two component indicator of my invention;

Fig. 2 is a modified form of a two component indicator of my invention;

Fig. 3 is a schematic representation of a magnetic analysis circuit into which the two component indicator of Fig. 1 has been incorporated.

Figure 4:
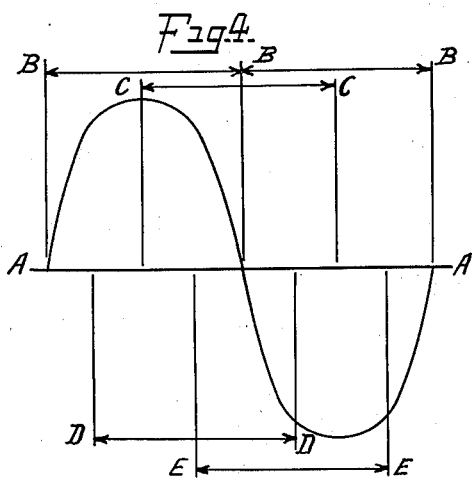
Figs. 4, 5, 6, 7 and 8 are wave diagrams illustrative of the principles of the invention.
Figure 7:
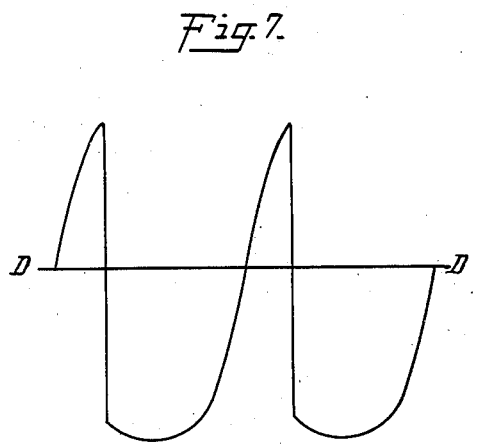

Referring to Fig. 1 it will be seen that a commutator 37 is mounted on the shaft of a two pole synchronous motor 38 which is energized by a source of alternating current 6. The commutator 37 is equipped with two separate commutator segments 39 and 40 which are connected respectively to two contact rings 35 and 36.

Two pairs of diametrically opposed brushes, 41, 42 and 43—44 are symmetrically disposed around the periphery of the commutator in contact with the segments 39 and 40. The two brush pairs are 90° phase displaced from each other and may be moved in unison around the periphery of the commutator. A D'Arsonval or other type of integrating galvanometer 46 is connected in series between brushes 41 and 42, and a similar galvanometer 45 is connected to brushes 41 and 42. Brushes 33 and 34 are in contact with rings 35 and 36, respectively, of the commutator and deliver the current which is to be rectified to the commutator. The current to be rectified is of the same frequency as that which drives the synchronous motor 38, and may be derived either directly or by induction from the same alternating current source.

When a sinusoidal voltage is impressed across the commutator through brushes 33 and 34, and thence through contact rings 35 and 36 and contact segments 39 and 40, the brush pairs 41, 42 and 43, 44 deliver a rectified voltage to the galvanometers 46 and 45. The character of this rectified voltage may be best explained with reference to Figs. 4 to 8.

Figure 5:
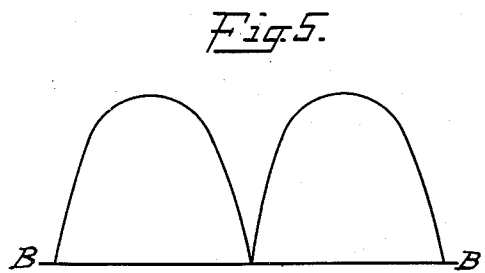
Figure 8:
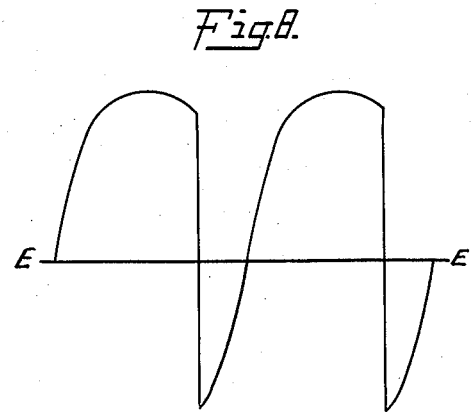
Figure 6:
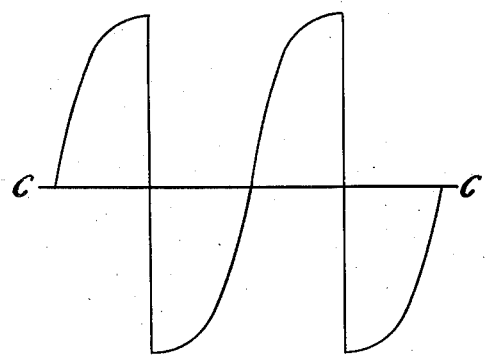

The curve A—A of Fig. 4 represents one cycle of the voltage impressed between brushes 33 and 34. A position of brush pair 41, 42 with respect to the cycle is represented by B—B on this diagram, and similarly a position of the brush pair 43, 44 which is 90° phased displaced from brush pair 41, 42, is represented on the diagram by C—C. When the brush pairs are located at B—B and C—C, the resultant rectified voltages are as represented by Figs. 5 and 6. The curve B—B of Fig. 5 represents the wave picked up by brush pair 41, 42, and is a typical fully rectified alternating current wave. The curve C—C of Fig. 6 shows the shape of the wave across brush pairs 43, 44. It will be apparent that the curve B—B of Fig. 5 is the usual form for rectified voltage and will cause a pronounced deflection of the integrating galvanometer 46. The curve C—C on the other hand, is equally distributed on either side of the axis or abscissa and integration by means of the galvanometer 45 produces a zero reading on this instrument. Curves B—B and C—C represent a condition of symmetrical rectification. However, if the brush pair 41, 42 is located at points D—D of Fig. 4 and brush pair 43, 44 is located at points E—E, the resultant voltage waves are shown respectively by Figs. 7 and 8. These waves, D—D and E—E are unsymmetrically rectified, and the proportion of the curves on either side of the abscissas are unequal. Integration of these waves by the galvanometers will result in decided deflections of both galvanometers. From these deflections it is possible to reconstruct the wave form and the voltage vector of the curve A—A.

In Fig. 4 the position B—B on the voltage wave may be taken as representative of the arbitrarily established first phase in which the wave is broken, and the position C—C may be taken as representative of the second phase displaced from the first phase by a substantially constant angle, in the instance illustrated—90 degrees. In such case D—D represents a position of the shifted first phase B—B and E—E represents a position of the shifted second phase C—C.

Likewise D—D and E—E may be taken to represent respectively the first phase and second phase before shifting, in which case B—B and C—C represent the respective relationships to the voltage wave of the shifted first and shifted second phases.

The apparatus of Fig. 1 is adapted to an investigation of the primary harmonic of the alternating current. In some instances it may be desirable or necessary to investigate an additional harmonic of the current, say the third. In this case it will be necessary to suppress all but the desired harmonic by inserting a filter in the circuit. It will also be necessary to increase the speed of the commutator 37 three times, or to replace it with the type of commutator shown in Fig. 2.

Referring now to Fig. 2, which illustrates a commutator designed for the analysis of the third harmonic of the current under investigation, it will be seen that in general it corresponds to construction of the synchronous commutator shown in Fig. 1. However, the number of commutating segments 39, 40, has been tripled and the arrangement of the brushes 41, 42 and 43, 44 has been changed in accordance with the new arrangement of the commutating segments. In practice it is sometimes desirable to combine the synchronous commutator illustrated by Fig. 1 and Fig. 2 upon a common shaft to facilitate an easy change from one to the other when both the first and third harmonic are to be investigated.

Fig. 3 illustrates an application of a two component indicator of the type illustrated in Fig. 1 in a magnetic analysis apparatus. Referring to Fig. 3, two primary induction coils 1 and 2 are connected in series with a fixed resistor 5 and an ammeter 4 to the outlet side of an autotransformer 3. The autotransformer is energized by an alternating current source 6. The primary coils are preferably identical and constructed of a suitable number of turns of insulated copper wire of low ohmic resistance. Secondary coils 13 and 14 are disposed respectively in inductive relationship with the primary coils and are connected in series opposition with a filter comprising a suitable inductance 28 and a capacitance 29 to the contact points of a double-pole double-throw switch 48. Because commutator arrangement shown is adapted to the analysis of the first harmonic of the exciter current the filter 28 and 29 is designed to suppress all harmonics of exciter current except the first. The remaining contact points of the switch 48 are connected, respectively, to either side of the fixed resistor 5 which, as has been observed, is located in the primary circuit. The construction of the commutator 37 is exactly as has been described for Fig. 1. The commutator 37 is actuated by a double pole synchronous motor 38 which receives its current from the alternating current source 6. The contact arms of switch 48 are connected to brushes 33, 34 of the synchronous commutator by suitable leads. The two brush pairs of the commutator are 90° phase displaced as in the case of Fig. 1.

In the operation of the device of Fig. 3, switch 48 is first located upon the contact points which are connected on either side of the resistor 5. A standard A, whose magnetic characteristics are known, is inserted in the field of coils 1 and 13, and a specimen B, whose magnetic characteristics are to be determined, is inserted in the field of coils 2 and 14. The apparatus is then energized and the movable brushes 41, 42 and 43, 44 are adjusted upon the periphery of the synchronous commutator 37 until one galvanometer, for instance 45, shows a maximum, and the other galvanometer 46 a zero reading. This manipulation permits the correlation of the phase of the two indicator readings with the phase of the primary exciter current. This having been accomplished, switch 48 is closed upon the secondary circuit. If the magnetic characteristics of standard A and specimen B are not identical, differential secondary current will be established in the secondary circuit across the brushes 34, 33. The filter 28, 29 serves to eliminate all but the first harmonic of the differential current so that the resulting wave form is truly sinusoidal. This induced differential current is then analyzed into two components 90° phase displaced, the displacement being correlated with the phase of the primary exciter current.

A more specific application of the two component indicator of this invention to a magnetic analysis problem is set forth in my co-pending application, Serial Number 716,942, filed March 23, 1934. The application of the commutator is not, however, limited to the art of magnetic analysis. Numerous other applications will undoubtedly occur to the man skilled in the art.

The indicators employed in my apparatus may be either of the directly indicating or of the automatic recording type. In the latter case, the apparatus permits the automatic registration of the two phase displaced components, an accomplishment which has not been possible heretofore.

It will be apparent that the indicators need not necessarily be of the D'Arsonval type since any galvanometer which performs an integrating function may be substituted for the D'Arsonval type of instrument. Because of their relatively rugged construction, D'Arsonval galvanometers are preferable in most industrial applications.

I claim:

1. The method of magnetic analysis which comprises simultaneously establishing alternating magnetic fluxes in a standard of known magnetism affecting properties and in a specimen to be tested, inducing by means of said magnetic fluxes two secondary currents, opposing said currents in a circuit, filtering out all but one harmonic of the resulting differential current, breaking up said filtered differential current into two or more components displaced from each other by constant phase angles, simultaneously integrating said components, and producing the integrated components for inspection.

2. The method of magnetic analysis which comprises simultaneously establishing an alternating magnetic flux in a standard of known magnetism affecting properties and in a specimen to be tested, inducing by means of said magnetic flux two secondary currents, opposing said currents to produce a differential current, filtering out all but one harmonic of the resulting differential current, rectifying successive cycles of the differential current with respect to two or more arbitrarily established origins displaced from each other by constant phase angles, integrating the components thus obtained, shifting the origins of rectification with respect to the cycles of differential current until one integrated component attains a maximum value and another component attains a minimum value, and producing for inspection the values of the integrated components thus obtained.

3. The method of magnetic analysis which comprises simultaneously establishing alternating magnetic fluxes in a standard of known magnetism affecting properties and in a specimen to be tested by means of a primary alternating current, correlating the phase of a synchronous commutator with the phase of the primary current, inducing opposed secondary currents in a secondary circuit by means of said alternating magnetic fluxes, suppressing all but one harmonic of the resulting differential secondary current, breaking up said harmonic into two components by means of the synchronous commutator, simultaneously integrating said components and producing the integrated components for inspection.

4. The method of magnetic analysis which comprises simultaneously establishing alternating magnetic fluxes in a standard of known magnetism affecting properties and in a specimen to be tested by means of a primary alternating current, correlating the phase of a synchronous commutator with the phase of the primary current, inducing opposed secondary currents by means of said alternating magnetic fluxes, suppressing all but one harmonic of the differential current, breaking up said harmonic into two components by means of the synchronous commutator which operates in phase with the primary current, simultaneously integrating said components, and producing a continuous record of the values of the integrated components for inspection.

5. The method of analyzing a differential secondary alternating current which comprises simultaneously inducing two secondary currents, opposing said currents in a circuit, breaking up the differential current thus produced into a plurality of components displaced from each other by constant phase angles, simultaneously integrating said components, and producing the integrated components for inspection.

6. The method of analyzing an alternating current which comprises breaking up successive cycles of the current in an arbitrarily established first phase to produce a component of the current in the first phase and simultaneously breaking up successive cycles of the current in a second phase displaced from the first by a substantially constant angle to produce a component of the current in the second phase, separately integrating the components of the first and second phase and producing the integrated components for inspection, thereafter simultaneously shifting the position of the first and second phase to new positions relative to successive cycles of the current while preserving the constant angle between the two phases, then breaking up successive cycles of the current in the shifted first phase to produce a component of the current in the shifted first phase and simultaneously breaking up successive cycles of the current in the shifted second phase to produce a component of the current in the shifted second phase, separately integrating the components of the current in the shifted phases and producing the integrated components in the shifted phases for inspection.

7. The method of analyzing an alternating current which comprises breaking up successive cycles of the current in an arbitrarily established first phase to produce a component of the current in the first phase and simultaneously breaking up successive cycles of the current in a second phase displaced from the first phase by an angle of about 90° to produce a component of the current in the second phase, separately integrating the components and producing them for inspection, thereafter simultaneously shifting the phase relationship of the first phase and the second phase with respect to successive cycles of the alternating current while preserving the angle of 90° between the two phases until one of the integrated components attains a maximum value and the other attains a minimum value, and separately producing the integrated component of maximum value and the integrated component of minimum value for inspection.

THEODOR ZUSCHLAG.